Sept. 14, 1937.  H. S. DOLECKI  2,093,237
LENS SHADE
Filed Nov. 1, 1935  2 Sheets-Sheet 1

Harry Stanley Dolecki,
Inventor,
Delos F. Haynes,
Attorney.

Sept. 14, 1937.　　　　H. S. DOLECKI　　　　2,093,237
LENS SHADE
Filed Nov. 1, 1935　　　　2 Sheets-Sheet 2
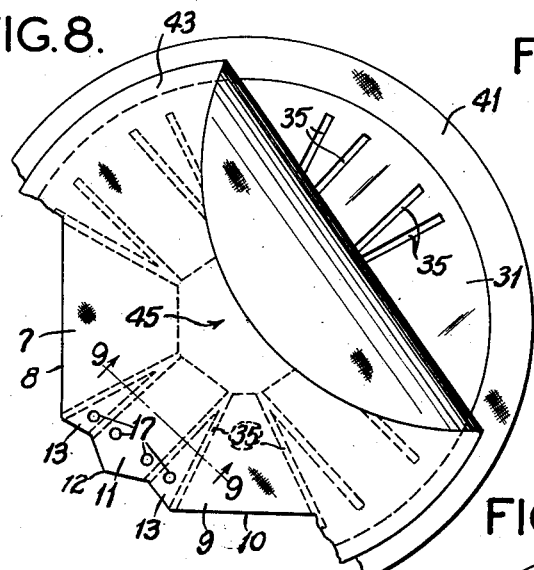
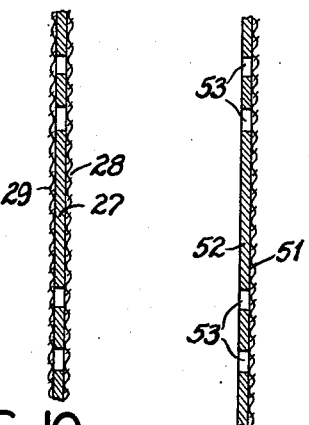
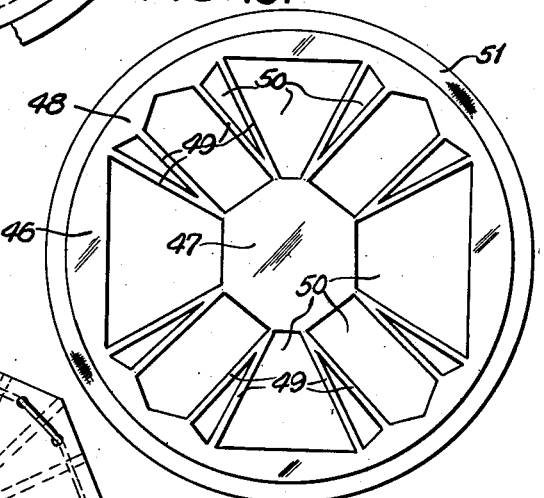
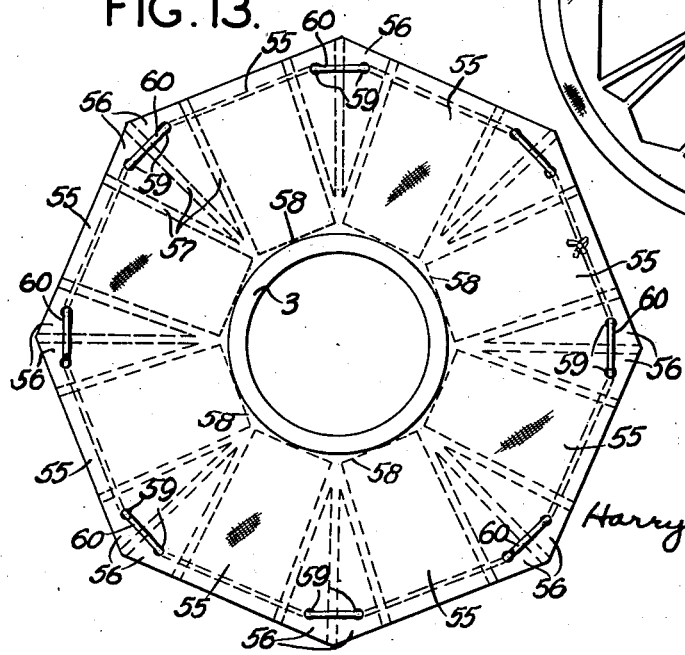

Patented Sept. 14, 1937

2,093,237

UNITED STATES PATENT OFFICE 2,093,237

LENS SHADE

Harry Stanley Dolecki, St. Louis, Mo.

Application November 1, 1935, Serial No. 47,737

9 Claims. (Cl. 88—1)

This invention relates to lens shades, and with regard to certain more specific features, to lens shades particularly adapted for use on photographic objectives.

Among the several objects of the invention may be noted the provision of a lens shade of the class described which is particularly adapted for use on the lens or objective of a folding camera; a lens shade of the class described which may readily be collapsed or folded into a substantial planar condition; and the provision of a lens shade of the class described which, although sturdy and substantial in construction, can be made from cheap materials at a minimum cost. Other objects will be in part obvious and in part pointed out hereinafter.

The invention accordingly comprises the elements and combinations of elements, features of construction and arrangements of parts, which will be exemplified in the structures hereinafter described, and the scope of the application of which will be indicated in the following claims.

In the accompanying drawings, in which are illustrated several of various possible embodiments of the invention, Fig. 1 is a front elevation of a lens shade embodying the present invention;

Fig. 8 is a plan view illustrating several subsequent steps in the manufacture of the shade;

Fig. 9 is an enlarged fragmentary cross section taken substantially along line 9—9 of Figures 4 and 8;

Fig. 10 is a plan view illustrating an alternative method of making the present invention;

Fig. 11 is an enlarged cross section illustrating the structure of the shade produced when the method of Fig. 10 is used;

Similar reference characters indicate corresponding parts throughout the several views of the drawings.

A principal objection to the majority of lens shades for photographic objectives now in use is that they require such a considerable amount of space for their storage. There is no lens shade available on the market which may be retained as a substantially permanent fixture on the lens of a folding camera, because the lens shades available take up so much room that they can not be fitted into the space remaining in front of the lens when the camera is folded. This means that the lens shade, if it is to be carried, has to be carried exteriorly of the camera, and this factor tends to discourage the use of lens shades. The present invention provides a lens shade which may be retained substantially permanently on the lens of the camera, even when it is folded or collapsed. This is accomplished by making the lens shade in such a manner that it may be collapsed itself, or flattened, into a minimum of space when the camera is folded.

Figure 1:
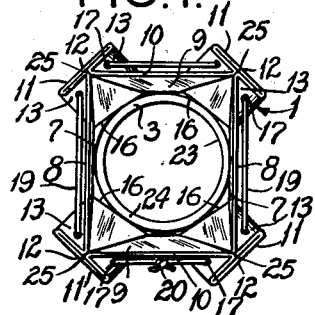
Figure 2:
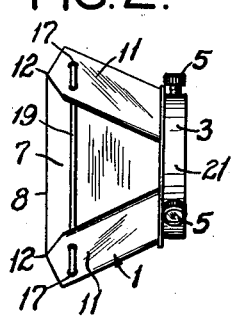
Fig. 2 is a side elevation of the shade of Fig. 1.
Figure 3:
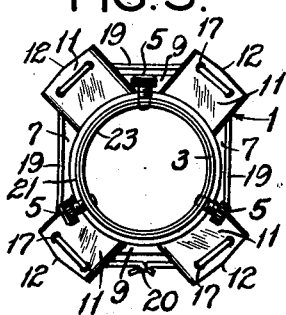
Fig. 3 is a back elevation of the shade of Fig. 1.

Referring now more particularly to Fig. 1, numeral 1 indicates a lens shade embodying the present invention. In accordance with best accepted practice, the general conformation of the lens shade is that of a truncated pyramid, of rectangular rather than square base. The shape of the rectangle is substantially equal to that of the film or plate upon which the photographic image is to be received, with appropriately proportioned dimensions. The lens shade is fitted to a mounting ring 3, which is provided with set screws 5 (see Figs. 2 and 3) for attaching it to the outer flange of the photographic objective.

The lens shade 1 itself comprises a number of folded or hinged regions which, when considered together, form substantially a flat annulus. In order to describe the various regions or sections of the annulus, reference is more particularly directed to Fig. 4 which shows the lens shade in a flattened or collapsed position. Numerals 7 and 9 indicate trapezoidal regions. The two trapezoidal regions 7, which are diametrically opposite each other, have their outer edges 8 equal in length to the desired long dimension of the rectangular opening to be provided, while the trapezoidal regions 9, which are likewise diametrically opposite each other, and at a 90° angle to the trapezoidal regions 7, have their outer edges 10 equal in length to the desired width of the rectangular opening. Positioned between each of the trapezoidal regions 7 and 9 is a substantially rectangular region or portion 11. There are four such regions 11 in all. The term "rectangular" is applied to the regions 11, although by reference to Fig. 4 it will be seen that in reality the region 11 is five-sided, providing a point 12. The purpose of the point 12, however, is merely for design and does not enter into the function as will be pointed out hereinafter. Triangular regions 13 separate each of the rectangular regions or portions 11 from each of the trapezoidal regions 7 or 9. A total of eight triangular portions 13 is thus provided.

Numeral 15 is applied generally to score lines or folds, which join all of the regions 7, 9, 11, and 13. The angular arrangement of said regions 7, 9, 11 and 13 is such that considered together, they form a complete circle or annulus.

While each of the sections 7, 9, 11 and 13 has a substantial length on the outer edge of the annulus (see for example, the edges 8 and 10 of the sections 7 and 9), it will be noted that only the sections 7, 9, and 11 have any length at the inner edge of the annulus, the sections 13 coming to a point at the inner edge. The inner edges of the sections 7, 9, and 11 are folded or hinged as indicated by numeral 16, to the ring 3.

Each of the sections 13 is provided near its outer edge with a hole 17. Each of the rectangular sections 11 is likewise provided with two holes 17 near its outer edge. Through the holes 17 and around the periphery of the annulus, is threaded or strung a rubber band indicated by numeral 19. The rubber band 19 is so strung that it underlies the trapezoidal regions or sections 7 and 9, and the central portion of each of the rectangular regions 11, while it overlies each of the folds or joints 15 between the sections 11 and 13. The ends of the rubber band 19 are tied in a knot 20 (see Fig. 1), thereby providing a constricting force at the outer edge of the annulus.

Figure 6:
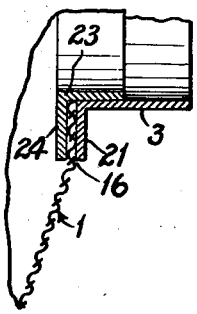
Fig. 6 is a fragmentary enlarged cross section taken substantially along line 6—6 of Fig. 4.

The manner of attaching the annulus comprising the various regions or sections to the lens mounting ring 3 is indicated in Fig. 6. The ring, as will be seen, comprises a cylindrical portion and a radial flange 21. A second ring 23, which slips with a tight fit into ring 3, is likewise provided, said second ring 23 also having a radial flange 24. The inner edge of the annulus is securely clamped in assembly between the flanges 21 and 24. The hinging or folding regions 16 are positioned approximately at the outer edge of the flanges 21 and 24 as indicated.

Because of the tension in the rubber band 19, there is at all times a tendency for the annulus to spring or snap in one direction or the other from the flattened out or developed position. For example, when the annulus springs forwardly from its Fig. 4 position, it assumes its Fig. 1 position, this being the position in which it is used for shading the lens in taking pictures. In this position, the corners of the trapezoidal regions 7 and 9 are brought into abutment as indicated at numeral 25 in Fig. 1. The edges 8 and 10 of the regions 7 and 9 therefore form a rectangle, as desired. In this position, the triangular regions 13 overlie the upper face of the rectangular regions 11. The general inner shape of the lens shade is that of a truncated, rectangular pyramid with planes formed by the regions 11 cutting the edges of the pyramid in an angular manner.

Figure 4:
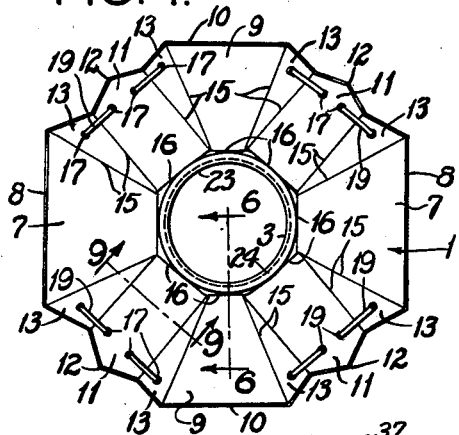
Fig. 4 is a front elevation of the shade of Fig. 1 in a flattened or collapsed condition.
Figure 5:
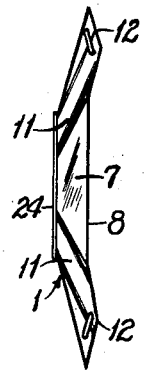
Fig. 5 is a side elevation of the shade in its Fig. 4 position.

If the annulus is returned to its flattened position and allowed to snap in the other direction, namely, backwards from the Fig. 4 position, it assumes the position illlustrated in Fig. 5. In practical use, the Fig. 5 position is limited by the camera structure, and the shutter or lens mounting surrounding the lens provides that the Fig. 5 position is substantially flat, as illustrated. However, even though no abutment such as the shutter is present, the structure of the annulus itself prevents the collapsing action from proceeding to a degree very much more than that shown in Fig. 5. In the Fig. 5 position, none of the sections 7, 9, 11 and 13 overlie each other flatwise, but rather there is an angular relationship maintained which gives the device a highly complicated, truncated, pyramidal shape.

The utility of the lens shade as thus constructed is quite apparent. It may be mounted on the outer flange of the photographic lens in the camera in a substantially permanent manner. When it is desired to take a picture, the outer edge of the annulus is grasped and the annulus pulled over its flat position so that it snaps to its Fig. 1, or "taking" position. When, in turn, it is desired to collapse the camera, the outer edge of the annulus is again grasped and forced backwards until it assumes its Fig. 5 position, when it is flat against the lens mounting or shutter, and occupies substantially no space, and the camera may be folded or collapsed with the lens shade in position.

The material of which the annulus 1 comprising the lens shade is made is of little moment. For example, fiber may be used, and the folds 15 and 16 may constitute score lines in the fiber. Or stamped thin metal sheets may be used, and the folds 15 and 16 provided by suitable hinging devices, such as small wire rings. However, a more suitable, economical and useful material for the construction of the shade has been found to comprise thin sheets of fiber or cardboard or the like, backed on each side by a stiffened cloth or fabric, such as the product sold on the market as "Hollaston's Photo-Cloth". This structure is indicated in Fig. 9 where numeral 27 indicates the fiber inserts, while numerals 28 and 29 indicate the fabric backings on each side of the fiber.

Figure 7:
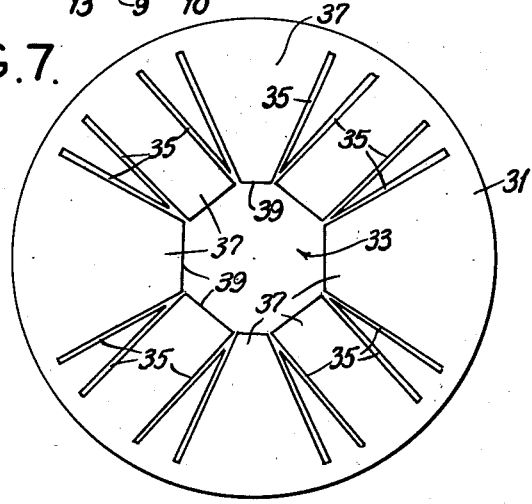
Fig. 7 is a plan view of a form comprising an initial step in manufacturing the shade of Fig. 1.

Figures 7 and 8 illustrate an advantageous method by which the lens shade having the special characteristics indicated in Fig. 9 may be manufactured. Referring to Fig. 7, numeral 31 indicates a disc or sheet of fiber, the shape of which is of no consequence. This sheet 31 is initially cut by stamping, die-cutting or the like, to the form shown in Fig. 7. A central opening 33 of generally octagonal shape comprises roughly the ultimate region of the lens shade in which the mounting ring 3 is to be positioned. Extending outwardly from the central opening 33 are a plurality of slots 35. The slots 35 separate the sheet 31 peripherally into regions 37 corresponding to the regions 7, 9, 11 and 13 of the finished lens shade. The length of the slots 35, however, is greater than the length of the sections 7, 9, 11 or 13 which they will ultimately provide.

The inner edges of the sections 37, indicated by numeral 39, ultimately form the folds or hinged portions 16 of the finished lens shade.

The sheet 31 as shown in Fig. 7 thus provides all of the pieces of fiber or cardboard necessary to make up the finished lens shade, in a connected position, and spaced or disposed in exactly the right position with relation to each other. It is readily seen that this is most distinctly advantageous over a method which involves cutting each of the sections 7, 9, 11 and 13 separately, and then assembling them into the finished lens shade.

From the step indicated in Fig. 7, the next step in manufacturing the lens shade is that illustrated in the upper righthand portion of Fig. 8. Here it will be seen that the cut sheet 31 is first glued to a fabric sheet 41, the fabric 41 ultimately constituting the backing 28 of the Fig. 9 embodiment. Over the top of the sheet 31 is then glued a second fabric sheet 43, ultimately to become the fabric layer 29 of the Fig. 9 embodiment. In the Fig. 8 showing, one corner of the fabric sheet 43 is turned down for purpose of illustration. The fiber sheet 31 is thus sandwiched between fabric sheets 41 and 43.

The next step in manufacturing the lens shade is shown in the lower lefthand corner of Fig. 8. This step comprises cutting the outer edge of the sandwich comprising the fabric sheets 41 and 43, and fiber sheet 31, to the ultimate shape of the lens shade. The characteristic outer edge of the lens shade will be seen in said lower lefthand corner. The cuttings may be performed by die-cutting or individually hand trimming the sandwiches. By this cutting, the various regions 7, 9, 11, and 13 of the ultimate lens shade are formed, and are separated from each other. The slots 35 are, in each case, cut off inside their outer ends, so that each of the sections 7, 9, 11 and 13 is now free of the others. The next step in the manufacture comprises punching the holes 17 in suitable positions. Thereafter the mounting rings 3 and 23 are secured to the central portion of the shade, necessitating the removal of the fabric region indicated by numeral 45 in Fig. 8. Thereafter only the rubber band 19 needs to be strung into position through the holes 17, and the folds 15 and 16 formed in the proper direction along the regions provided by the slots 35, and the shade is ready for operation.

Another method of manufacturing the shade embodied in this invention is indicated in Fig. 10. Referring to Fig. 10, numeral 46 indicates a stencil which is preferably formed of thin sheet metal, fiber or the like. The stencil 46 comprises a solid central portion 47 and a solid peripheral portion 48. The central portion 47 and the peripheral portion 48 are connected by a plurality of narrow strips or bars 49. The strips 49 are so arranged that openings 50 are provided therebetween. The general shape and arrangements of the openings 50 is substantially equivalent to the general shape of the various regions or sections 7, 9, 11 and 13 of the finished lens shade. In using this embodiment the stencil 46 is laid upon a sheet of fabric 51. A heavy glue or other suitable plastic material is then stencilled onto the fabric sheet 51. Before this glue dries, it is sprinkled or saturated with a suitable filler material, such as sand, clay, graphite or the like, so that upon setting, the regions 50 to which the glue had been applied, thicken into substantially rigid, board-like sections. Figure 11 shows a cross section of a structure thus produced. Numeral 51 indicates the fabric backing. Numeral 52 indicates in cross section, the regions provided for by the stiffened, solidified glue. Numeral 53 indicates regions which were overlaid by the strips 49 of the stencil 46, and which, therefore, have received no glue. The regions indicated by numeral 53 are provided for the folds 15 and 16 of the finished lens shade. The rigid regions 52 similarly form the regions or sections 7, 9, 11, and 13 of the finished lens shade.

A method similar to this comprises printing the glue on the fabric sheet with a suitably shaped cut (or printer's die) in place of using the stencil. The filler material is added after the glue printing, or is mixed with the glue prior to printing.

Figure 12:
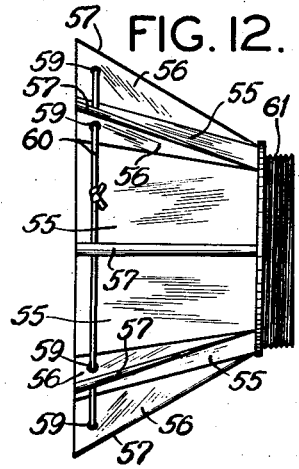
Fig. 12 is a side elevation of an alternative form of lens shade coming within the present invention; and, Fig. 13 is a plan view laid out flat of the shade of Fig. 12.

The invention thus far has been described in connection with an embodiment which has a rectangular opening in its shading position. While this is to be preferred for scientific reasons in taking photographs, it is sometimes desirable to provide a shade with a different shaped opening, for example, for use with extreme wide-angle lenses and the like. Figures 12 and 13 illustrate an embodiment which provides an octagonal opening in the lens shade in its position for use. This embodiment is merely to be considered as illustrative of the fact that, within the present invention, openings of any polygonal shape may be provided with suitable design.

For purposes of simplicity, the embodiment of Figures 12 and 13 has been shown as made by the methods indicated in Figures 7 and 8, although it will be clearly understood that it likewise can be made by the method of Fig. 10.

Referring to Fig. 13, it will be seen that the annulus of the present embodiment comprises eight trapezoidal regions 55, each of which is separated from the others by a pair of triangular regions 56. Fold lines 57 separate each of the regions 55 from each other and from the regions 56. Similar fold lines 58 are provided at the inner edges of the trapezoidal regions 55, hinging them to the mounting ring 3. Each of the triangular regions 56 has a single hole 59 provided therein. Through the holes 59 is strung a rubber band 60 in such manner that it underlies the regions 55 and overlies the folds 57 connecting each pair of triangular regions 56.

Fig. 12 indicates this embodiment of the invention in position for use. It will be seen that the fold lines 57 are so arranged that each pair of triangular regions 56 folds together in a face-to-face manner, bringing the edges of adjacent trapezoidal regions 55 together. The general conformation is that of a truncated octagonal pyramid. Figure 13 illustrates substantially the flattened position of the shade, corresponding to the Fig. 4 position of the first embodiment.

By way of illustration, Fig. 12 also shows an alternative form of lens mounting ring 3, which is provided with male screw threads 61. This type of lens mounting is sometimes necessary when the photographic objective has no outer flange upon which a ring of the type shown in the first embodiment of the invention can be slipped. In such objectives, there is usually provided a female screw thread into which the threads 61 may be fitted.

It has been found in operation that the rubber band 60 is a suitable resilient element to use in shades embodying the invention, and its life is sufficiently long for practical purposes. Further, if the rubber band 60 should break, it is a simple matter to replace it with a new rubber band. However, it will be understood that in more expensive embodiments of the invention, the rubber band 60 may be replaced by any other suitable resilient element, such as a long coil spring of relatively small diameter.

In view of the above, it will be seen that the several objects of the invention are achieved and other advantageous results attained.

As many changes could be made in carrying out the above constructions and processes without departing from the scope of the invention, it is intended that all matter contained in the above description or shown in the accompanying drawings shall be interpreted as illustrative and not in a limiting sense.

I claim:

1. A lens shade comprising a foldable annulus, a mounting ring, said annulus comprising segments which are hinged one to another, said segments being centrally hinged to said mounting ring, said segments being so shaped and arranged that said annulus is capable of being folded into the form of a truncated pyramid, and constricting resilient means secured to said segments near the outer periphery of said annulus, said constricting means being adapted to hold said annulus in its pyramidal form.

2. A lens shade comprising a mounting ring and shading means hinged to said mounting ring, said shading means being developable to a substantial planar form, and being likewise adapted to assume a pyramidal conformation, said shading means comprising a plurality of adjacent three and four sided segments foldably hinged together along adjacent sides, in such manner that the assembly of segments constitutes an annulus.

3. A lens shade comprising a mounting ring and shading means hinged to said mounting ring, said shading means being developable to a substantial planar form, and being likewise adapted to assume a pyramidal conformation, said shading means comprising a plurality of adjacent three and four sided segments foldably hinged together along adjacent sides, in such manner that the assembly of segments constitutes an annulus, said segments being so arranged, that upon folding them into pyramidal form, said four sided segments form the sides of the pyramid while said three sided segments are folded away from the pyramid.

4. A lens shade comprising a mounting ring and shading means hinged to said mounting ring, said shading means being developable to a substantial planar form, and being likewise adapted to assume a pyramidal conformation, said shading means comprising a plurality of segments hinged together to form an annulus, said segments including four trapezoidal segments, four substantially rectangular segments between said trapezoidal segments, and triangular segments between each trapezoidal segment and its adjacent rectangular segment, whereby the pyramidal form assumed is that of a rectangular pyramid.

5. A lens shade comprising a mounting ring and shading means hinged to said mounting ring, said shading means being developable to a substantial planar form, and being likewise adapted to assume a pyramidal conformation, said shading means comprising a plurality of segments hinged together to form an annulus, said segments including eight trapezoidal segments and two triangular segments between each pair of trapezoidal segments whereby the pyramidal form assumed by said segments is that of an octagonal pyramid.

6. A lens shade as set forth in claim 1 in which the annulus is formed of a relatively stiff sheet of material such as cardboard or fiber, with sheets of fabric glued to each side thereof.

7. A lens shade as set forth in claim 1 in which the annulus comprises a relatively stiff sheet of cardboard or fiber having fabric sheets glued on both sides thereof, and in which the said segments of the said annulus are separated by regions where no relatively stiff material is provided.

8. A lens shade as set forth in claim 1 in which the annulus comprises a sheet of fabric and said segments comprise areas of relatively stiff, solidified material applied to said fabric, the foldable regions between said segments being free of said stiff material.

9. A lens shade as set forth in claim 1 in which the constricting resilient element comprises a rubber band threaded through selected segments around the outer periphery of said annulus.

HARRY STANLEY DOLECKI.